Aug. 9, 1932.　　J. M. CHRISTMAN　　1,870,709
GEAR GENERATING MACHINE
Filed Oct. 29, 1930　　3 Sheets-Sheet 3

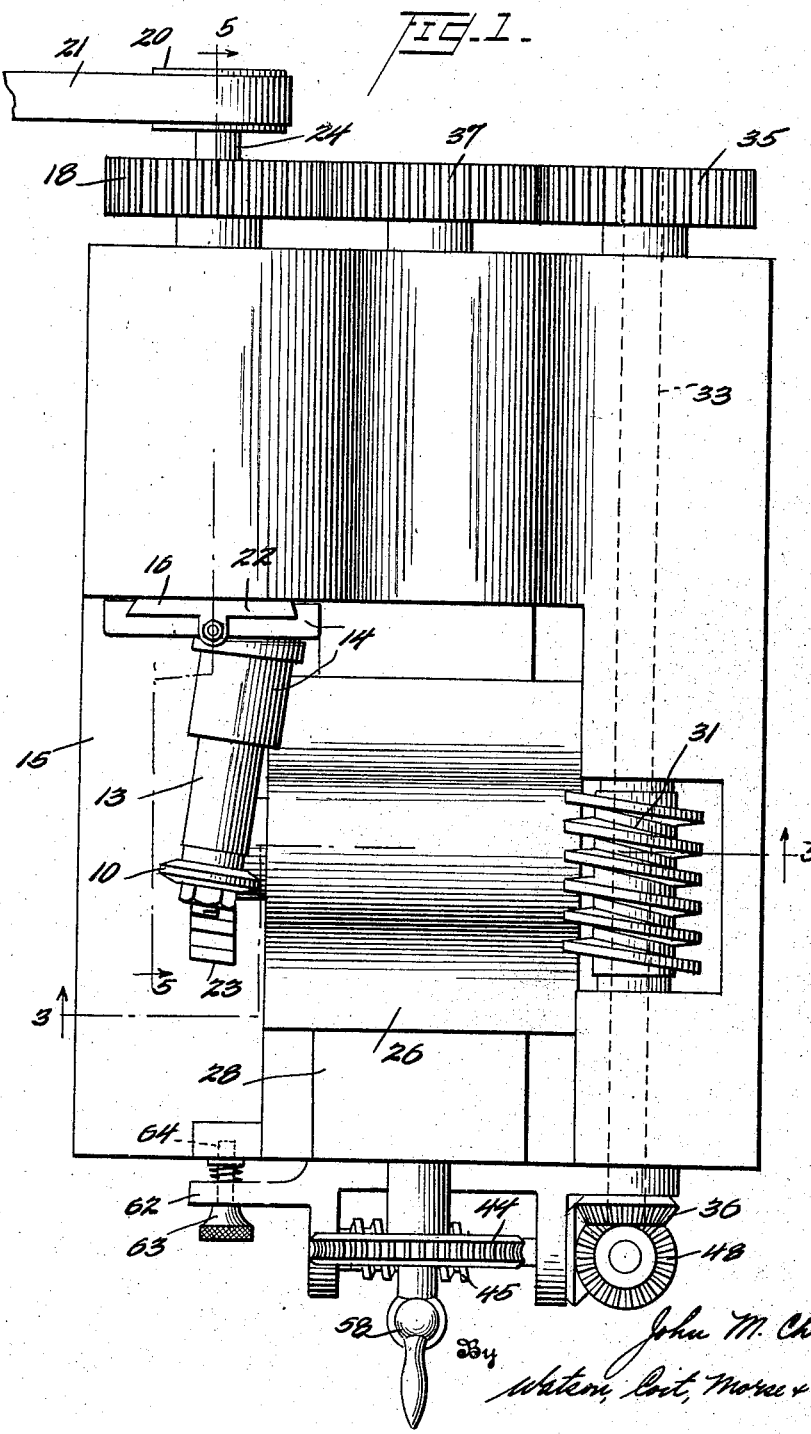

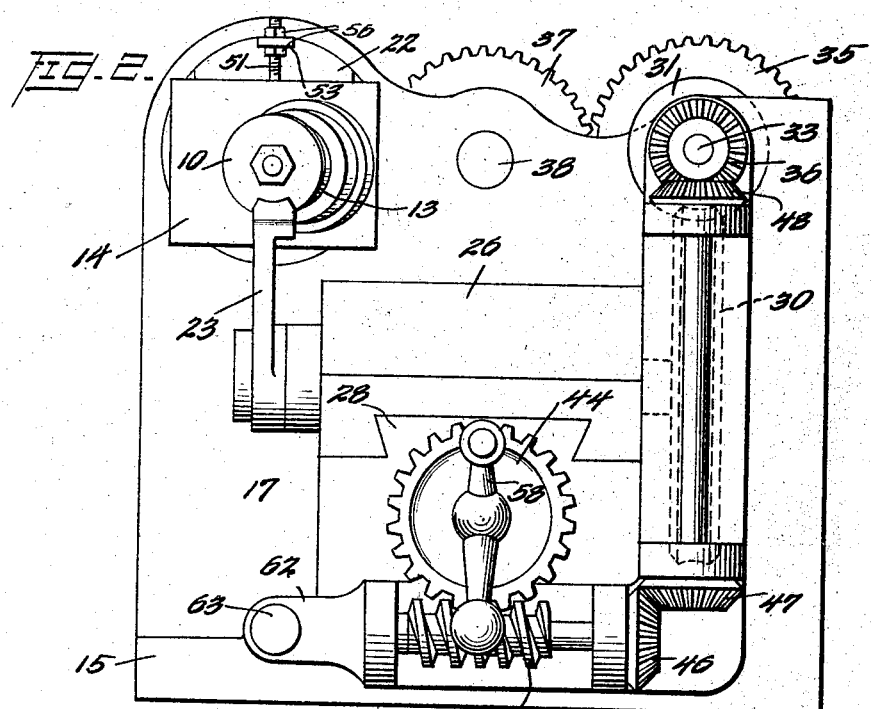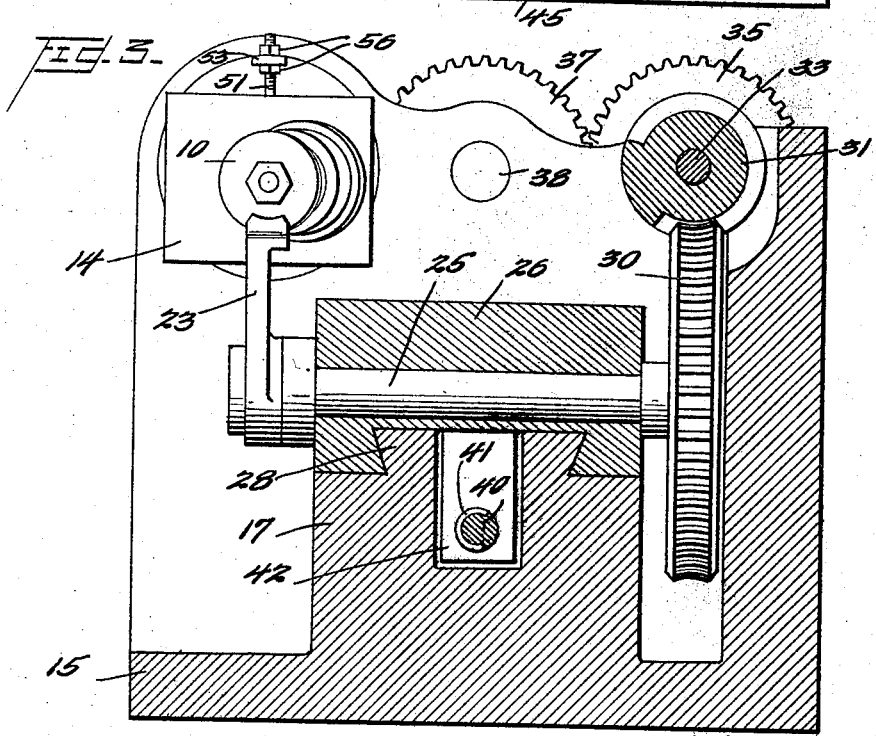

Inventor
John M. Christman,
By Watson, Coit, Morse & Grindle
Attorneys

Patented Aug. 9, 1932

1,870,709

UNITED STATES PATENT OFFICE

JOHN M. CHRISTMAN, OF DETROIT, MICHIGAN, ASSIGNOR TO PACKARD MOTOR CAR COMPANY, OF DETROIT, MICHIGAN, A CORPORATION OF MICHIGAN

GEAR GENERATING MACHINE

Application filed October 29, 1930. Serial No. 492,022.

This invention relates to machines for generating gear teeth and is particularly concerned with the grinding of teeth on worm gears.

It is an object of the invention to provide a machine of this character in which the grinding element and the gear on which it is operating are so moved relatively to each other as to generate an involute tooth surface.

It is important that grinding operations of this character be executed in such manner that the grinding element may move with rapidity across the tooth face with which it engages. For instance, in the grinding of worm gears by means of worm-shaped grinding elements it is impossible to obtain rapid relative motion, and as a result, a rubbing action rather than a true grinding action is obtained and the tooth surface is consequently scored. It is therefore a feature of the present invention that rapid motion may be imparted to the grinding element independently of the motion which results in the generation of the desired tooth surface.

A further object of the invention is the provision of a machine of this character in which the grinding element may be simply and cheaply formed, readily re-faced, and adjusted without removal from the machine to avoid frequent re-facing.

A more specific object of the invention is the provision of a machine for grinding worm gears in which the grinding element comprises a rapidly rotating disk so supported as to revolve about an axis eccentric to the axis of rotation thereof, the eccentricity of the path of revolution of the disk begin variable to compensate for wear on the disk, and in which a combined rotational and rolling movement is imparted to the worm gear to be ground, this movement being controlled by a master worm gear and worm.

Further features and objects of the invention will be apparent from the following description taken in connection with the accompanying drawings, in which Figure 1 is a plan view of a machine constructed in accordance with the principles of the present invention;

Figure 2 is an end elevation of the machine disclosed in Figure 1;

Figure 3 is a section on the line 3—3 of Figure 1;

Figure 4:
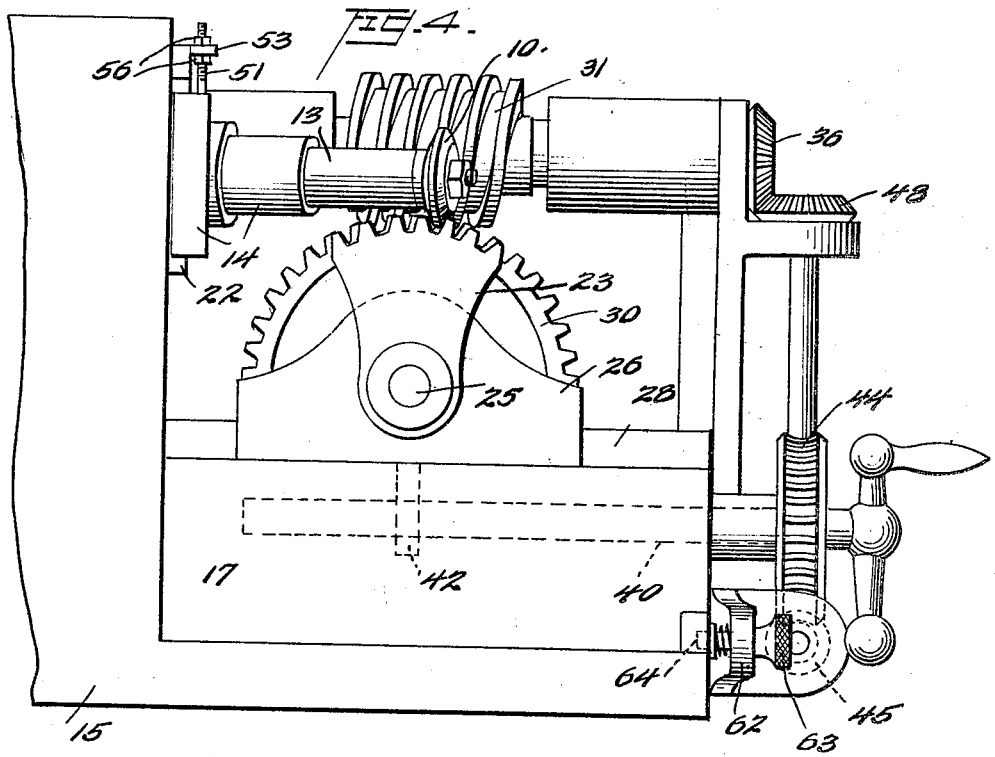
Figure 4 is a partial side elevation.
Figure 5:
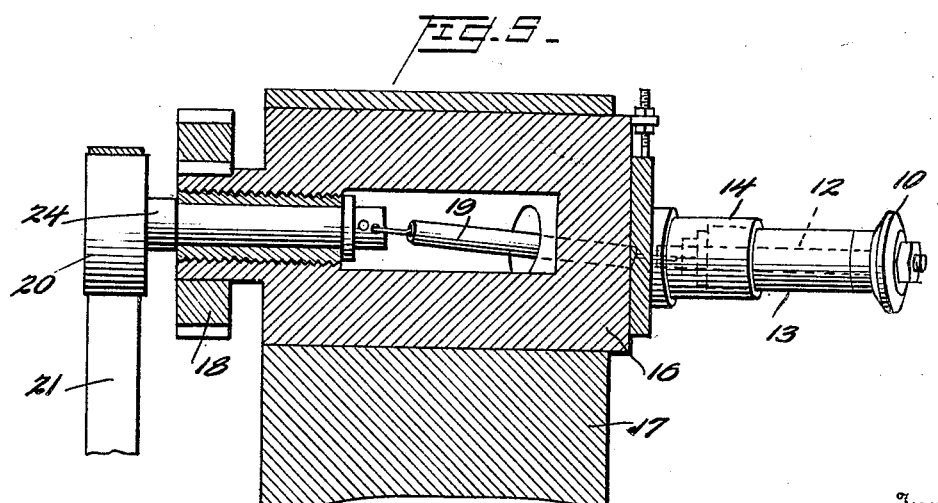
Figure 5 is a partial sectional view on the line 5—5 of Figure 1.

While the invention will be described herein as applied to the grinding of worm gear tooth surfaces to which it is particularly adapted, it will be appreciated that the invention is applicable to the grinding of other types of gears and that the embodiment of the invention illustrated in the drawings may be modified as necessary for this purpose. It will furthermore be apparent that the present machine may be used not only in the finishing and grinding operations, but also to effect the initial cutting of the teeth by the substitution of a suitable cutting tool for the grinding element shown herein. It will therefore be understood that the term "tool" as used hereinafter to describe the grinding element shown in the drawings is intended to comprehend any generating element which may be selected to perform the desired operation.

Referring more specifically to the drawings, it will be observed that the machine comprises a base 15 having a frame 17 mounted on the base or formed integrally therewith, the frame 17 serving to support the various movable parts of the machine. The tool is indicated by the reference numeral 10 and comprises a disk-shaped grinding wheel removably secured to a spindle 12 which is in turn journalled within a bearing 13 in the member 14, provision being made to prevent endwise movement of the spindle 12 within the bearing. A rotatable element 16 is journalled in the frame 17 and is driven from a spur gear 18 which is secured thereto in any convenient manner. The member 14 is mounted on one end of the element 16 for rotation therewith and provision is preferably made for shifting the member 14 transversely of the axis of rotation of the element 16 to vary the position of the tool or grinding wheel 10 with respect to that axis. A simple form of sliding connection between the member 14 and the element 16 is shown in the drawings and comprises a dove-tailed projection 22 on the element 16 extending transversely of the face thereof and engaging with a correspondingly shaped transverse recess in the member 14. Suitable means, hereinafter described, are provided for definitely positioning the member 14 on the face of the element 16 so that the grinding wheel 10 may be caused to follow a definite circular path eccentric with respect to the axis of the element 16.

A shaft 24 carrying a pulley 20 is journalled in the opposite end of the element 16 and is operatively connected with the spindle 12 by a suitable form of flexible driving means 19, the pulley 20 being rotated by means of the belt 21 which engages therewith. It will thus be observed that the spindle 12 may be rotated within its bearing in the member 14 independently of the motion which is imparted to the element 16 through the spur gear 18 so that the grinding disk 10 may be simultaneously rotated about its axis and revolved through a path eccentric thereto.

The gear blank on which the tooth surfaces are generated is illustrated in the drawings as a worm gear sector 23 and it will be understood that the term "gear blank" as used hereinafter is intended to refer either to the initial uncut blank or to a blank in which the teeth have already been formed or cut by an initial operation. The blank 23 is splined or otherwise suitably secured to a shaft 25 which is mounted for rotation in a carriage 26. This carriage is mounted for sliding movement on the frame 17 by means of the interfitting guides 28 on the carriage and frame, and is thereby constrained to move in the direction of the rotational axis of the element 16. The shaft 25 extends through the carriage 26 and carries at its opposite end a worm gear 30 which is hereinafter referred to as a master worm gear. A worm 31 carried by a shaft 33 meshes with and drives the master worm gear 30. The shaft 33, which is journalled in the frame 17, carries at its opposite ends the spur gear 35 and the bevel gear 36. The spur gear 35 is preferably of the same diameter as the gear 18 and these gears are operatively connected by an idler gear 37 which is mounted on a shaft 38 journalled in the frame.

It will now be observed that by reason of the connecting train of spur gearing between the worm 31 and the element 16, the disk will be caused to execute one revolution in the path eccentric to the axis of the element 16 for each revolution of the worm 31.

Since worm gear teeth are cut at an angle to the axis of the gear, the shaft 12 and the bearing 13 which supports this shaft are disposed at an angle to the axis of the element 16 which is equal to the angle of helix on the pitch line of the worm 31. The several parts of the machine are so arranged that when the grinding disk 10 is in a position to operatively engage the gear blank 23, the disk will occupy substantially its lowest position in the eccentric path through which it revolves and at the same time the axis of the shaft 12 lies in a substantially horizontal plane, the circular path traced out by the outer edge of the disk being preferably equal in size to the circumference of the worm with which the blank is intended to mesh.

It will now be understood that if the worm 31 has two threads having a lead equal to the lead of a worm which will mesh properly with the blank, the disk 10 will alternately engage and disengage the blank 23, passing between alternate tooth spaces in the blank, since the worm gear 30 and the blank 23 are advanced two tooth spaces for each rotation of the worm 31 and for each corresponding revolution of the disk 10 about the axis of the element 16.

In properly meshing worm gearing, the worm engages the worm gear over substantially the entire length of the former, and it is therefore essential that provision be made to roll the gear blank 23 and the worm gear 30 on the disk 10 and the worm 31 respectively. For instance, in Figure 4 of the drawings the disk 10 is shown in cutting or grinding position adjacent one end of the gear blank 23, and it is obvious that the full depth of the cut will not be made unless the shaft 25 is positioned directly beneath the disk 10. For this purpose provision is made for automatically advancing the carriage 26 on the frame 17 during the operation of the machine. A shaft 40 journalled in the frame 17 is provided with a screw thread 41 which in turn engages with a nut 42 on the carriage 26. Secured to the shaft 40 is a worm gear 44 which is driven by a worm 45 through bevel gears 46, 47, 48, and 36 from the shaft 33, on which the worm 31 is mounted. The worm gears 44 and 45 and the screw and nut gearing 41 and 42 are so proportioned that during the execution of the number of revolutions of the disk 10 about the axis of the element 16 necessary to properly grind the entire set of teeth on the blank 23, the carriage 26 will move from left to right as shown in Figure 4, a distance substantially equal to the length of the worm 31 so that grinding or cutting of the blank 23 is effected in all positions of the shaft 25 with respect to the disk 10.

In practice it is found desirable to pass the disk 10 at least thirty times through each tooth space on the gear blank 23, and if the worm 31 has two threads so that the disk 10 engages alternate tooth spaces, and the worm gear 30 has thirty-one teeth, the element 16 will make nine hundred complete revolutions in order to finish the grinding operation. It will be noted, however, that the disk 10 is independently driven by means of the belt 21 and may therefore be rotated with extreme rapidity so that a proper grinding or cutting action may be obtained regardless of the speed with which the master worm is rotated.

It is of course possible to vary the number of teeth on the master worm gear 30 provided suitable changes are effected in the lead and number of threads on the worm 31 and the proper ratio is selected for the gears 18 and 35. The pitch diameter of the master worm gear 30 and the blank 23 must, however, be equal in order to ensure the proper generating action.

It will be observed that wear on the disk 10 will not substantially affect the contour of the disk but will merely result in causing the outer edge of the disk 10 to describe a smaller circle so that the teeth on the gear blank will not be ground to the required depth or with the necessary degree of accuracy. For this reason I provide the means hereinbefore referred to for adjusting the position of the grinding disk 10 radially of the element 16 and for retaining the disk in any position of adjustment to avoid frequent replacement or re-facing of the disk and the loss of time incident to such replacement. The adjusting mechanism may assume various forms, but a simple arrangement is illustrated in the drawings in which a bolt 51 is swivelled to the member 14, this bolt being threaded through a lug 53 on the element 16. The bolt 51 is provided with a headed end 55 which may be engaged by a wrench to properly position the member 14 and is retained in any position to which it may be adjusted by means of lock nuts 56 also threaded on the bolt 51. It will be readily understood that the precise manner of effecting this adjustment may be widely varied and that the construction shown in the drawings is merely illustrative.

At the completion of a grinding or cutting operation it is necessary to return the carriage 26 to its original position, and for this purpose the worm 45 must be disengaged from the worm gear 44 which may then be rotated by the handle 58 in the reverse direction to position the carriage for a further operation. As shown in the drawings, this may be effected by supporting the train of gearing 45, 46, 47 and 48 in a bracket which is swivelled on the shaft 33 so that the entire train may be swung about the axis of the bevel gear 36 to engage and disengage the gears 44 and 45. A handle 62 is preferably provided on one end of the frame and a detent 63 on the handle is arranged to engage in a recess 64 in the frame to normally retain the gears 44 and 45 in proper meshing relation.

Other types of gears may be cut and ground in a similar manner, it being only necessary to substitute gearing of a similar type to that being cut for the worm 31 and master worm gear 30 of the embodiment illustrated herein. Such further alterations and modifications of the described arrangement are contemplated as fall within the spirit and scope of the appended claims.

Having thus described the invention, what is claimed as new and desired to be secured by Letters Patent is:

1. In apparatus for generating tooth surfaces on a gear blank, the combination with a driving gear, of a master gear meshing therewith, means for rotating the gear blank in timed relation with said master gear, a rotating generating tool, means moving in timed relation to the rotational movement of said gear blank for revolving said tool in a path eccentric to the rotational axis thereof to move the tool into and out of engagement with said gear blank, and mechanism for imparting linear rolling movement to said master gear with respect to said driving gear and similar movement to said gear blank with respect to said cutting tool.

2. In apparatus for generating tooth surfaces on a worm gear blank, the combination with a master worm gear, of a driving worm meshing therewith, means for supporting said gear blank coaxially with said worm gear for rotation therewith, a generating tool substantially circular in outline, means for rotating said tool about its center, rotatable means on which said tool is eccentrically supported, and means having driving connection with said worm for rotating said last named supporting means to move said tool into and out of engagement with said gear blank.

3. In apparatus for generating tooth surfaces on a worm gear blank, the combination with a master worm gear, of a driving worm meshing therewith, means for supporting said gear blank coaxially with said worm gear for rotation therewith, a generating tool substantially circular in outline, means for rotating said tool about its center, rotatable means on which said tool is eccentrically supported for movement through a path defining a plane extending transversely of the face of the blank, means having driving connection with said worm for rotating said last named supporting means to move said tool into and out of engagement with said gear blank, and mechanism for moving said tool, worm gear and first mentioned supporting means axially of said worm to roll said worm gear along the latter.

4. Apparatus for grinding tooth surfaces on a gear blank comprising a master worm, a worm gear meshing therewith, means for rotating the gear blank from said worm gear, means operatively connected to said worm and rotatable about an axis parallel to the plane of said gear blank, a rotatable shaft carried by said means eccentrically of said axis and inclined thereto at an angle substantially equal to the helix angle of said worm, a grinding disk having a contour approximating the transverse contour of a thread on the master worm, said disk being supported on said shaft, and means for rotating said shaft, whereby said disk may be successively passed between different pairs of teeth as the blank is rotated.

5. Apparatus for grinding tooth surfaces on a gear blank comprising a master worm, a worm gear meshing therewith, means for rotating the gear blank from said worm gear, means operatively connected to said worm and rotatable about an axis parallel to the plane of said gear blank, a rotatable shaft carried by said means and inclined to the axis thereof at an angle substantially equal to the helix angle of said worm, a grinding disk having a contour approximating the transverse contour of a thread on the master worm, said disk being supported on said shaft and disposed eccentrically of the axis of said means, means for rotating said shaft, whereby said disk may be successively passed between different pairs of teeth as the blank is rotated, and means for imparting substantially rectilinear motion to said worm gear and gear blank to effect rolling thereof with relation to said worm and grinding disk respectively.

6. Apparatus for grinding tooth surfaces on a gear blank comprising a master worm, a worm gear meshing therewith, means for rotating the gear blank from said worm gear, means operatively connected to said worm and rotatable about an axis parallel to the plane of said gear blank, a rotatable shaft carried by said means and inclined to the axis thereof at an angle substantially equal to the helix angle of said worm, a grinding disk having a contour approximating the transverse contour of a thread on the master worm, said disk being supported on said shaft eccentrically of said means, means for rotating said shaft, whereby said disk may be successively passed between different pairs of teeth as the blank is rotated, means for imparting substantially rectilinear motion to said worm gear and gear blank to effect rolling thereof with relation to said worm and grinding disk respectively, and means for effecting adjustment of said shaft radially of the rotating means on which it is carried to vary the eccentricity of said disk to compensate for wear on the disk.

7. In apparatus for generating tooth surfaces on a worm gear blank, the combination with a master worm gear, of a driving worm meshing therewith, means for supporting said gear blank coaxially with said worm gear for rotation therewith, a generating tool substantially circular in outline, means for rotating said tool about its center, rotatable means on which said tool is eccentrically supported for movement through a path defining a plane extending transversely of the face of the blank, and means having driving connection with said worm for rotating said last named supporting means to move said tool into and out of engagement with said gear blank, the contour of said disk approximating the transverse contour of a thread on the driving worm and the circular path of movement described by the outer portion of said disk having a diameter approximating the diameter of the worm.

8. In apparatus for generating tooth surfaces on a gear blank, the combination with a substantially circular generating tool, of means for rapidly rotating said tool about its center, means for moving said tool in a path eccentric to its rotational axis to cause the tool to engage and disengage said blank, and means operable in timed relation to said last named means for automatically advancing said gear blank with respect to said tool to present fresh surfaces to the latter.

9. In apparatus for generating tooth surfaces on a gear blank, the combination with a substantially circular generating tool, of means for rapidly rotating said tool about its center, and independent means for moving said tool in a path eccentric to its rotational axis to cause the tool to engage and disengage said blank, said tool when in engagement with said blank being disposed in a plane angularly related to the axis of the gear blank.

10. Apparatus for grinding tooth surfaces on a worm gear blank comprising means for rotating the gear blank, means operatively connected to said last named means and rotatable about an axis parallel to the plane of said gear blank, a rotatable shaft carried by said means and inclined to the axis thereof, a grinding disc having a contour approximating the transverse contour of a worm gear thread, said disc being supported on said shaft, and means for rotating said shaft, whereby said disc may be successively passed between different pairs of teeth as the blank is rotated.

11. In apparatus for generating tooth surfaces on a gear blank, the combination with a substantially circular generating tool, of means for rapidly rotating said tool about its center, means for moving said tool in a path eccentric to its rotational axis to cause the tool to engage and disengage said blank, and means operatively connected to said second-named means for advancing said gear blank with respect to said tool through a distance sufficient to present a different tooth space to the tool on each complete rotation of the tool in its eccentric path.

12. In apparatus for generating tooth surfaces on a gear blank, the combination with a substantially circuular generating tool, of means for rapidly rotating said tool about its center, means for moving said tool in a path eccentric to its rotational axis to cause the tool to engage and disengage said blank, and means operatively connected to said first named means for rotating said gear blank on its axis through an angle sufficient to present a different tooth space to the tool on each complete rotation of the tool in its eccentric path.

13. In apparatus for generating tooth surfaces on a gear blank, the combination with means for rotating the gear blank about the axis thereof, a generating tool having a substantially circular outline, means for rotating the tool about its center, and means operable in timed relation with said first named means for revolving said tool about an axis transverse to the axis of said blank into and out of engagement with said blank.

14. In apparatus for generating tooth surfaces on a gear blank, the combination with means for rotating the gear blank about the axis thereof, a generating tool having a substantially circular outline, means for rotating the tool about its center, means operable in timed relation with said first named means for revolving said tool about an axis transverse to the axis of said blank into and out of engagement with said blank, and means for rolling said gear blank along that tangent to the pitch circle thereof which is parallel and adjacent to the last named axis.

In testimony whereof I hereunto affix my signature.

JOHN M. CHRISTMAN.